(12) United States Patent
Pero

(10) Patent No.: US 8,844,261 B2
(45) Date of Patent: Sep. 30, 2014

(54) VARIABLE AREA FAN NOZZLE THRUST REVERSER

(75) Inventor: Edward B. Pero, Somers, CT (US)

(73) Assignee: United Technologies Corporation, Hartford, CT (US)

( * ) Notice: Subject to any disclaimer, the term of this patent is extended or adjusted under 35 U.S.C. 154(b) by 334 days.

(21) Appl. No.: 13/370,704

(22) Filed: Feb. 10, 2012

(65) Prior Publication Data

US 2012/0137655 A1     Jun. 7, 2012

Related U.S. Application Data

(62) Division of application No. 12/306,329, filed as application No. PCT/US2006/039957 on Oct. 12, 2006, now Pat. No. 8,151,551.

(51) Int. Cl.
*B63H 11/00*     (2006.01)
*F02K 1/70*     (2006.01)

(52) U.S. Cl.
CPC ..................................... *F02K 1/70* (2013.01)
USPC ............................. 60/204; 60/226.2; 60/226.3

(58) Field of Classification Search
CPC ....................................................... F02K 1/70
USPC ...................... 60/226.1–226.3, 262, 770, 204; 239/265.37; 244/110 B
See application file for complete search history.

(56) References Cited

U.S. PATENT DOCUMENTS

| | | | |
|---|---|---|---|
| 3,483,702 A | | 12/1969 | Ward |
| 3,612,401 A | * | 10/1971 | Ellis et al. ................ 239/265.29 |
| 3,739,582 A | * | 6/1973 | Maison ........................ 60/226.2 |
| 3,764,096 A | * | 10/1973 | Wright ...................... 244/110 B |
| 3,779,010 A | | 12/1973 | Charnay et al. |
| 3,815,357 A | * | 6/1974 | Brennan ....................... 60/226.2 |
| 4,922,713 A | | 5/1990 | Barbarin et al. |
| 5,706,649 A | | 1/1998 | Robinson et al. |
| 6,439,504 B1 | | 8/2002 | Ahrendt |
| 2004/0068978 A1 | | 4/2004 | Lair et al. |
| 2005/0086927 A1 | | 4/2005 | Lair et al. |
| 2008/0010969 A1 | | 1/2008 | Hauer et al. |

FOREIGN PATENT DOCUMENTS

FR     2146109     7/1971

OTHER PUBLICATIONS

Search Report and Written Opinion mailed on Sep. 20, 2007 for PCT/US2006/039957.
International Preliminary Report on Patentability dated Feb. 2, 2009.

* cited by examiner

*Primary Examiner* — Phutthiwat Wongwian
(74) *Attorney, Agent, or Firm* — Carlson, Gaskey & Olds, P.C.

(57) ABSTRACT

A nozzle for use in a gas turbine engine includes nozzle doors coupled with a fan nacelle wherein the nozzle doors move in unison between a plurality of positions to influence a bypass airflow through a fan bypass passage. A linkage connects the nozzle doors and an actuator. A louver section coupled with the linkage moves in unison with the nozzle doors between a plurality of louver positions to direct a portion of the bypass airflow in a selected direction.

10 Claims, 4 Drawing Sheets

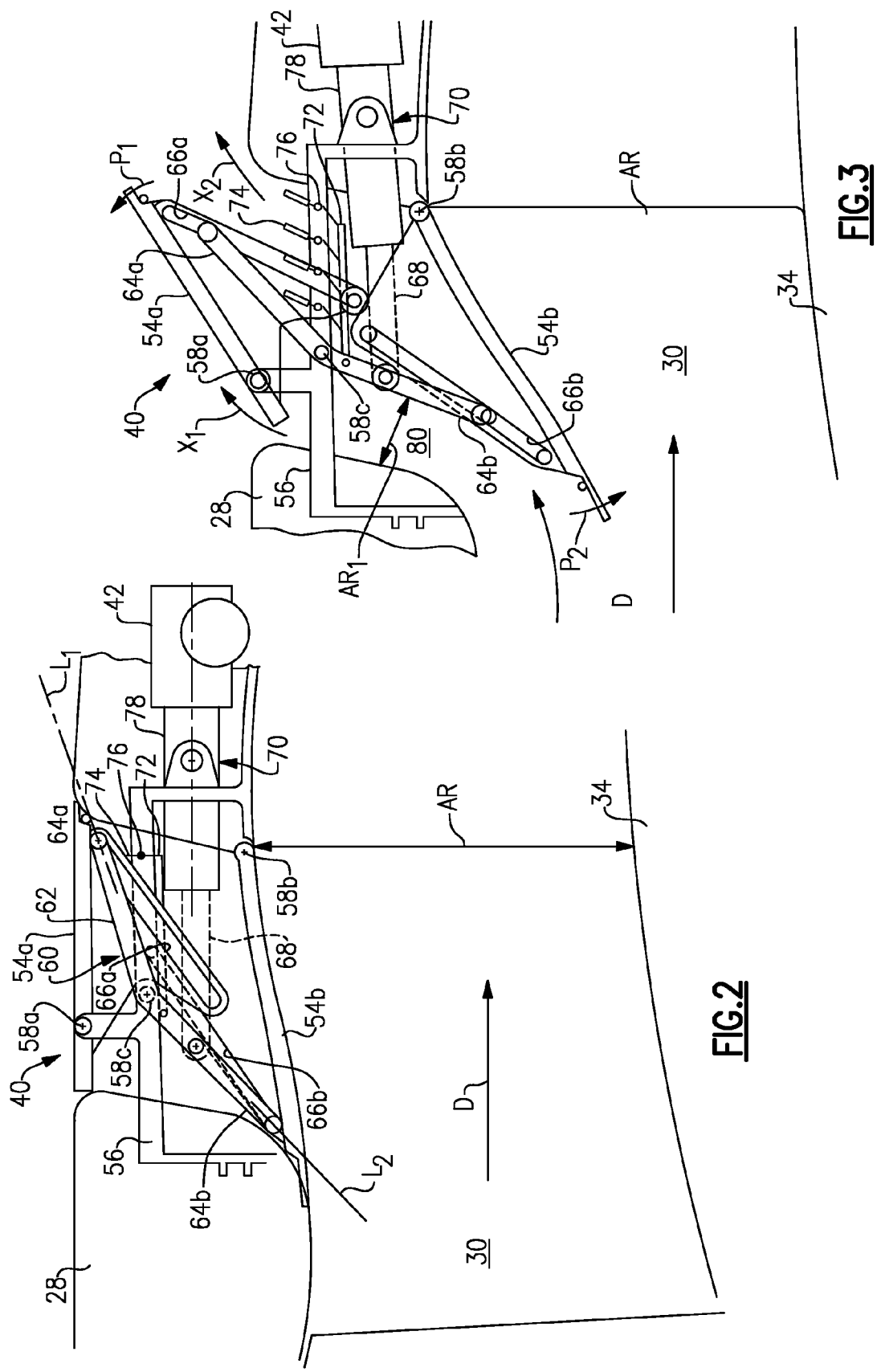

VARIABLE AREA FAN NOZZLE THRUST REVERSER

REFERENCE TO RELATED APPLICATIONS

This is a divisional of U.S. application Ser. No. 12/306329 filed on Dec. 23, 2008 now U.S. Pat. No. 8,151,551, which is a National Phase of PCT Application No. PCT/US2006/039957 filed on Oct. 12, 2006.

BACKGROUND OF THE INVENTION

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The limited functionality and the weight that a conventional thrust reverser adds to the engine contribute to engine inefficiency. Therefore, in order to improve engine efficiency, there is a need for a system having a thrust reverser that is integrated with at least one other engine system for additional functionality outside of landing.

SUMMARY OF THE INVENTION

An example nozzle for use in a gas turbine engine includes nozzle doors coupled with a fan nacelle wherein the nozzle doors move in unison between a plurality of positions to influence a bypass airflow through a fan bypass passage. A linkage connects the nozzle doors and an actuator. A louver section coupled with the linkage moves in unison with the nozzle doors between a plurality of louver positions to direct a portion of the bypass airflow in a selected direction.

In one example, the plurality of positions of the nozzle doors include a stowed position that corresponds to an aircraft cruise condition, an intermediate position that corresponds to an aircraft take-off condition, and a thrust reverse position that corresponds to an aircraft landing condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 is a schematic view of example nozzle doors and linkage of the nozzle shown in FIG. 1, in a stowed position.

FIG. 3 is a schematic view of the example nozzle doors and linkage of the nozzle shown in FIG. 1, in an intermediate position.

DETAILED DESCRIPTION OF THE PREFERRED EMBODIMENT

Figure 1:
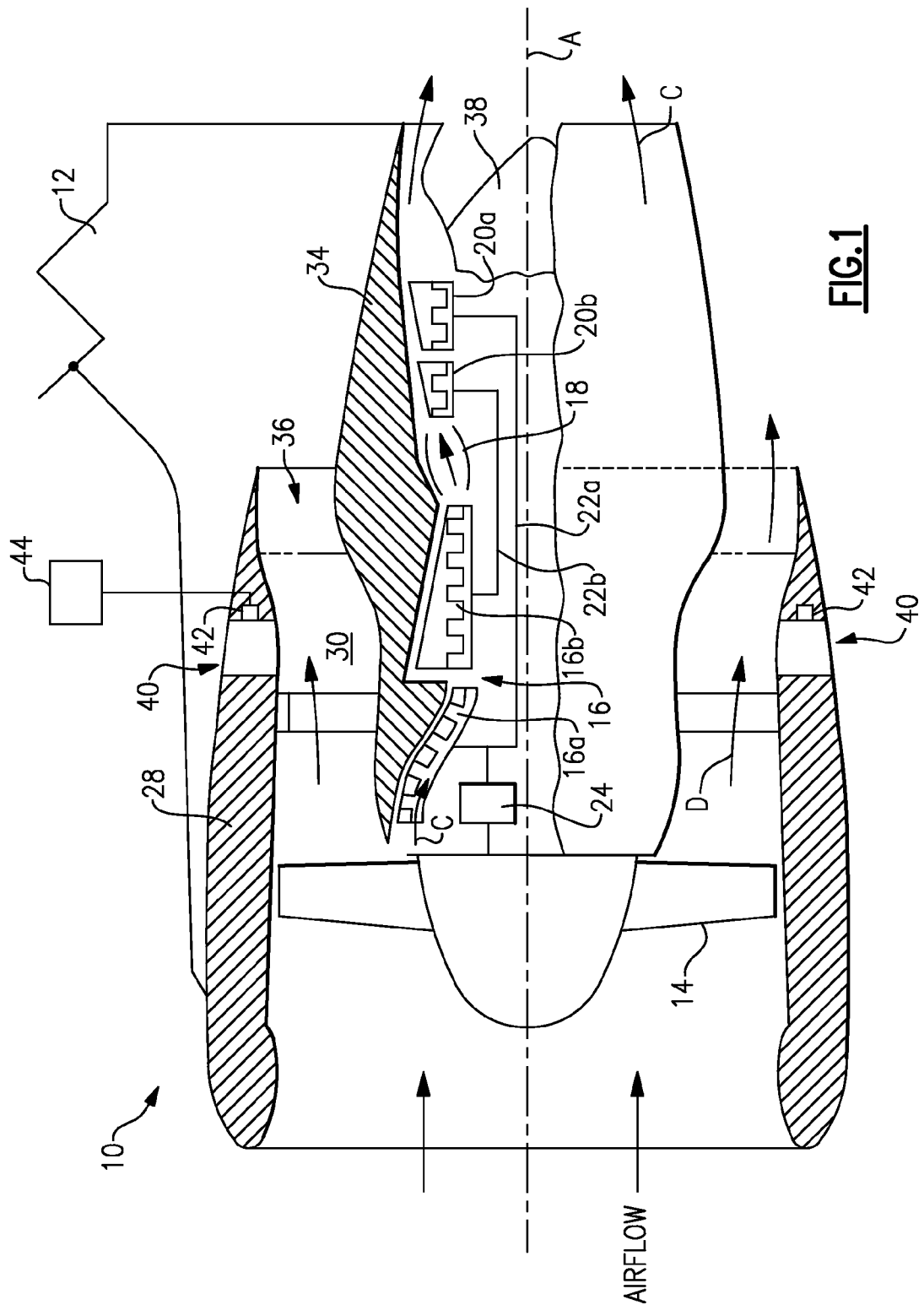
FIG. 1 illustrates selected portions of an example gas turbine engine system having a nozzle that integrates functions of a variable fan nozzle and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass geared turbofan arrangement. In one example, the bypass ratio is greater than 10:1, and the fan 14 diameter is substantially larger than the diameter of the low pressure compressor 16a. The low pressure turbine 20a has a pressure ratio that is greater than 5:1, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the bypass airflow D due to the high bypass ratio.

The example gas turbine engine 10 shown FIG. 1 also includes a nozzle 40 (shown schematically) associated with the bypass passage 30. In this example, the nozzle 40 is forward of a trailing edge of the nacelle 28, however, in other examples, the nozzle 40 is located farther forward or at the trailing edge of the nacelle 28. In this example, the nozzle 40 is coupled with the nacelle 28.

The nozzle 40 includes actuators 42 for movement between a plurality of positions to influence the bypass air flow D, such as to manipulate an air pressure of the bypass air flow D. A controller 44 commands the actuators 42 to selectively move the nozzle 40 among the plurality of positions to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. For cruise, the nozzle 40 is closed and the pressure ratio is controlled by the rear exhaust 36. In some examples, the nozzle varies a cross-sectional area associated with the bypass passage 30 by approximately 20% to increase the bypass airflow D for take-off. Thus, the nozzle 40 enables the performance envelope to be maintained over a variety of different flight conditions.

FIG. 2 illustrates selected portions of an example nozzle 40 having a first nozzle door 54a and a second nozzle door 54b. The first nozzle door 54a is located radially outwards of the second nozzle door 54b relative to the centerline axis A.

In this example, the nacelle 28 supports a frame 56 that in turn supports the nozzle doors 54a and 54b. The first nozzle door 54a is pivotally connected to the frame 56 at a first pivot connection 58a and the second nozzle door 54b is pivotally connected to the frame 56 and a second pivot connection 58b. Known types of pivot connections are used in this example.

A linkage 60 connects the nozzle doors 54a and 54b with the actuator 42. In the illustrated example, the linkage 60 includes a first link 62 having opposed sections 64a and 64b that are slidingly received within respective slots 66a and 66b using a known type of sliding connection, such as with a friction member, bushing, guide member, or other connection. In this example, the section 64a extends in a lengthwise direction along axis $L_1$ and the section 64b extends in a lengthwise direction along axis $L_2$, which is transverse to $L_1$. A second link 68 is pivotally connected at one end with the first link 62 and at the other end with a trunnion pivot 70 to the actuator 42.

The first link 62 is pivotally connected to the frame 56 at pivot connection 58c and connected to a louver rod 72. The louver rod 72 is coupled to louvers 74 that are each moveable about corresponding pivots 76 such that movement of the first link 62 moves the louver rod 72 to thereby move the louvers 74 about the pivots 76.

In the illustrated example, the nozzle doors 54a and 54b are in a stowed position. In the stowed position, the nozzle 40 defines a cross-sectional area, AR, which corresponds to the cross-sectional area of the annular bypass passage 30 adjacent the nozzle 40. As will now be described, the controller 44 selectively commands the actuator 42 to move the nozzle doors 54a and 54b in unison to an intermediate position or a thrust reverse position to influence the bypass airflow D in a desired manner, depending on flight conditions (e.g., take-off, landing, and cruise).

FIG. 3 schematically illustrates the nozzle doors 54a and 54b in an example intermediate position. In one example, the controller 44 commands the actuator 42, in response to take-off, to move the nozzle doors 54a and 54b to the intermediate position. Take-off may be indicated using known parameters, such as rotor 22a or 22b speed, weight on a landing gear of an aircraft, aircraft speed, etc.

To move the nozzle doors 54a and 54b, the actuator 42 retracts the actuator rod 78, which in turn moves the second link 68. Movement of the second link 68 causes the first link 62 to pivot about the pivot connection 58c such that the sections 64a and 64b slide along the respective slots 66a and 66b. The movement of the sections 64a and 64b within the slots 66a and 66b causes the nozzle doors 54a and 54b to pivot about respective pivot connections 54a and 54b in the directions indicated at $P_1$ and $P_2$. The first nozzle door 54 pivots in forward direction $P_1$ and the second nozzle door 54b pivots in aft direction $P_2$.

In the intermediate position, the first nozzle door 54a extends radially outwards from the nacelle 28, and the second nozzle door 54b extends radially inwards from the nacelle 28 into the bypass passage 30. This opens up an auxiliary passage 80 for discharge of a portion of the bypass airflow D from the bypass passage 30 in an aft direction $X_1$. Discharging the portion of the bypass airflow D in the aft direction $X_1$ provides the benefit of maintaining at least a portion of the thrust generated by the bypass airflow D.

The auxiliary passage 80 also provides additional cross-sectional area $AR_1$ that influences the bypass airflow D. For example, a relatively smaller overall cross-sectional area (AR plus $AR_1$) would restrict the bypass airflow D and produce a pressure build-up (i.e., an increase in air pressure) within the bypass passage 30. A relatively larger cross-sectional area permits more bypass airflow D and reduces the pressure build-up (i.e., a decrease in air pressure). Thus, depending on the input parameters into the controller 44, the controller 44 commands the actuator 42 to move the nozzle doors 54a and 54b to a desired intermediate position to control the bypass airflow D in a desired manner.

In the illustrated example, movement of the first link 62 also causes the louver rod 72 to move the louvers 74. In the illustrated position, the louvers 74 direct a portion of the bypass airflow D conveyed through the passage 80 that discharges aft of the first nozzle door 54a in an aft direction $X_2$. Directing the flow in the aft direction $X_2$ provides the benefit of maintaining at least a portion of the thrust generated by the bypass airflow D.

Figure 4:
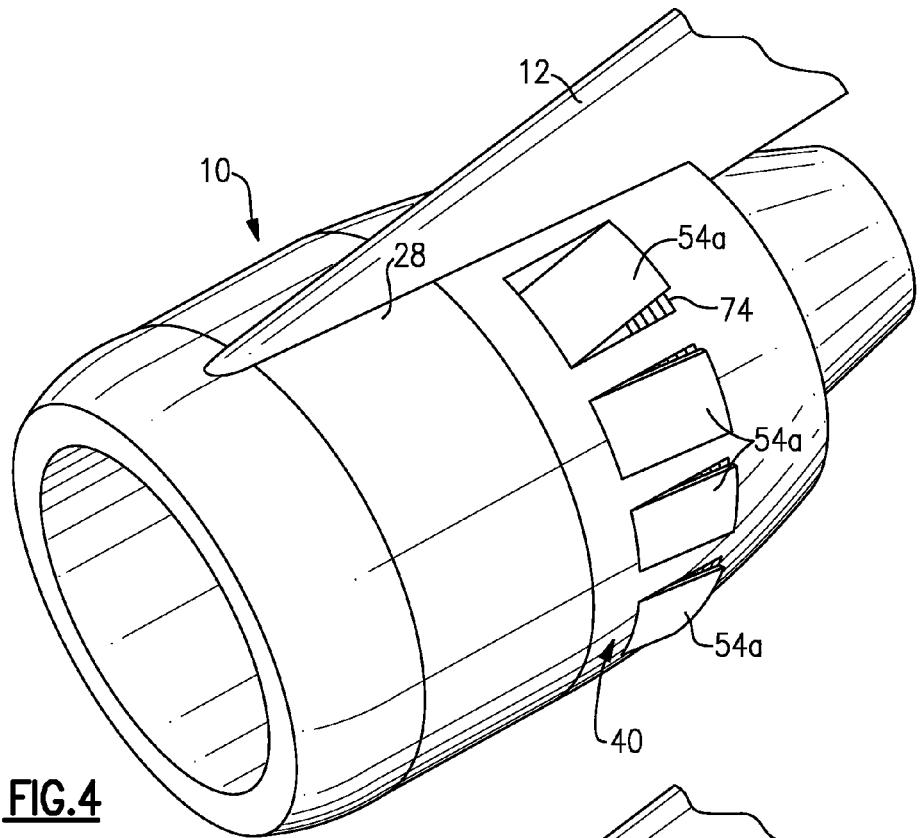
FIG. 4 is a perspective view of the nozzle doors in the intermediate position.

Referring to the example shown in FIG. 4, pairs of nozzle doors 54a and 54b (not shown) are spaced about the circumference of the nacelle 28 to influence the bypass airflow D as described above. In this example, each pair of nozzle doors 54a and 54b includes a corresponding actuator 42 that communicates with the controller 44. Thus, the controller 44 can move all of the pairs of nozzle doors 54a and 54b in unison. Given this description, one of ordinary skill in the art will recognize alternative arrangements of the nozzle doors 54 and 54b to meet their particular needs.

Figure 6:
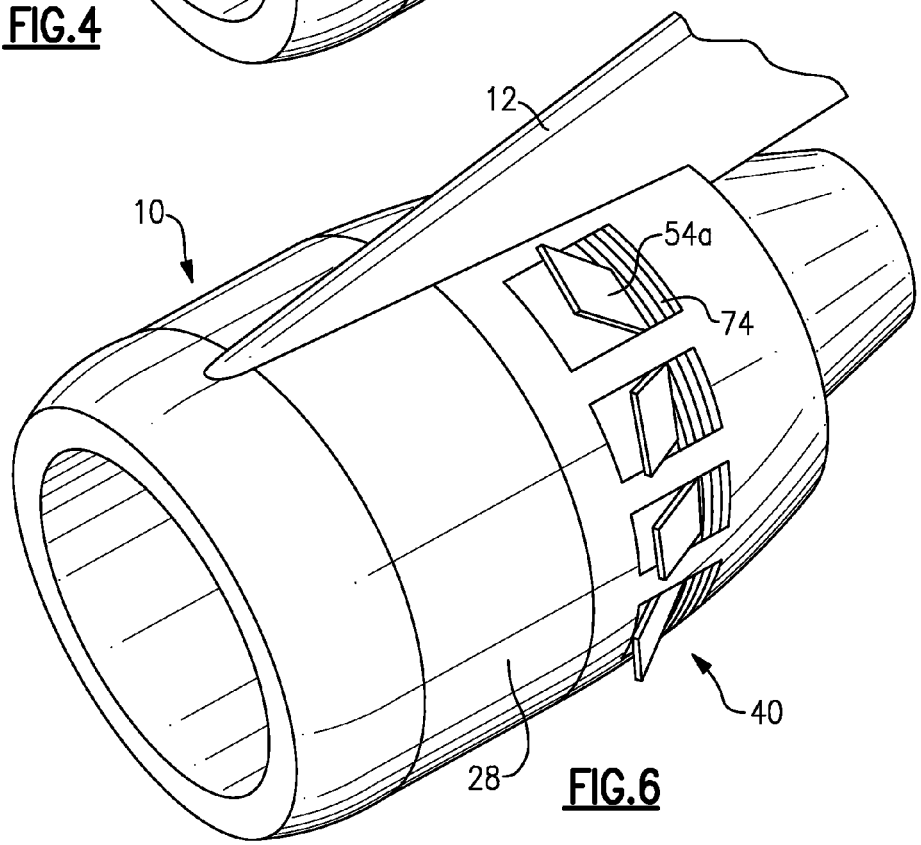
FIG. 6 is a perspective view of the example nozzle doors and linkage in the thrust reverse position.
Figure 5:
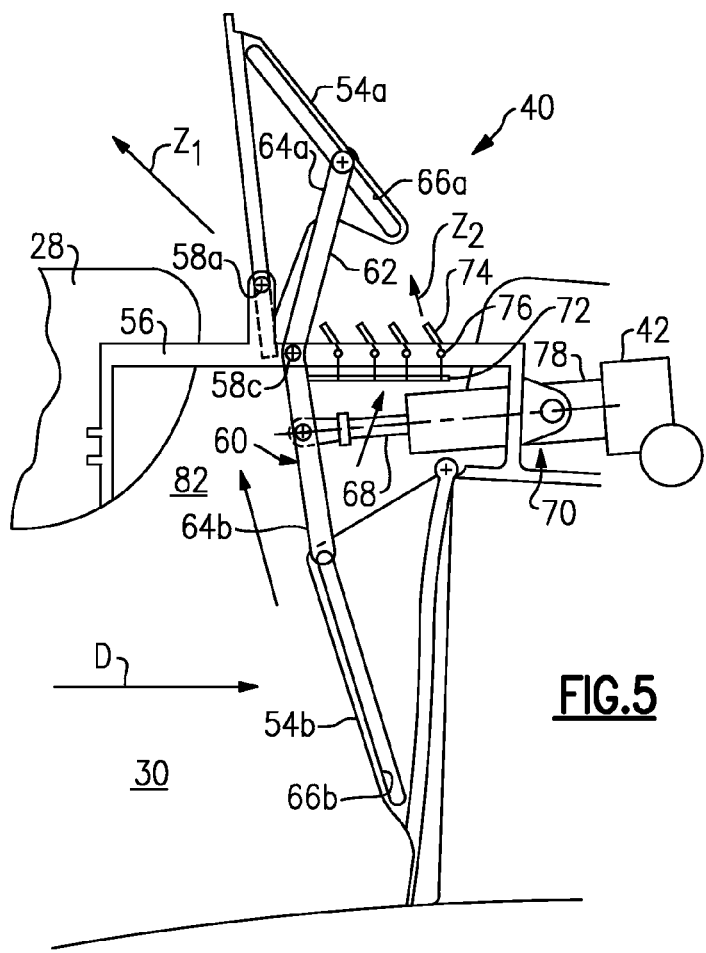
FIG. 5 is a schematic view of the example nozzle doors and linkage of the nozzle shown in FIG. 1, in a thrust reverse position.

FIGS. 5 and 6 schematically illustrate the nozzle doors 54a and 54b in an example thrust reverse position for slowing forward movement of an aircraft. In one example, in response to a landing condition, the controller 44 commands the actuator 42 to move the nozzle doors 54a and 54b using the linkage 60 to the thrust reverse position illustrated. The landing condition may be indicated from a landing gear of an aircraft, a sensor that detects a weight on the landing gear, aircraft altitude, or other known indicator.

To move to the thrust reverse position, the actuator further retracts the actuator rod 78, which in turn further moves the second link 68 and causes the first link 62 to move the nozzle doors 54a and 54b about the respective pivot connections 54a and 54b. In the thrust reverse position, the second nozzle door 54b extends farther into the bypass passage 30 to deflect a significant portion of the bypass airflow D through passage 82. The first nozzle door 54a further deflects the bypass airflow D in a forward direction, $Z_1$, to provide a thrust reversing force.

The louver rod 72 moves in unison with the nozzle doors 54a and 54b to pivot the louvers 74. In the illustrated position, the louvers 74 direct a portion of the bypass airflow D that discharges aft of the first nozzle door 54a in a forward direction $Z_2$. In this position, the louvers 74 provide the benefit of achieving additional thrust reversing force from the portion of the bypass airflow D that discharges aft of the first nozzle door 54a.

As can be appreciated from the illustrations, as the first link 62 moves, the second link 68 pivots about the trunnion pivot 70. This provides the benefit of allowing the second link 68 a degree of freedom to move with the first link 62 in an arcuate path about pivot connection 58c.

Upon completion of landing, the controller 44 commands the actuator 42 to extend the actuator rod 78 to move the linkage 60 and the nozzle doors 54a and 54b in an opposite manner from that described above to the intermediate position or stowed position, depending on input parameters into the controller 44.

Figure 7:
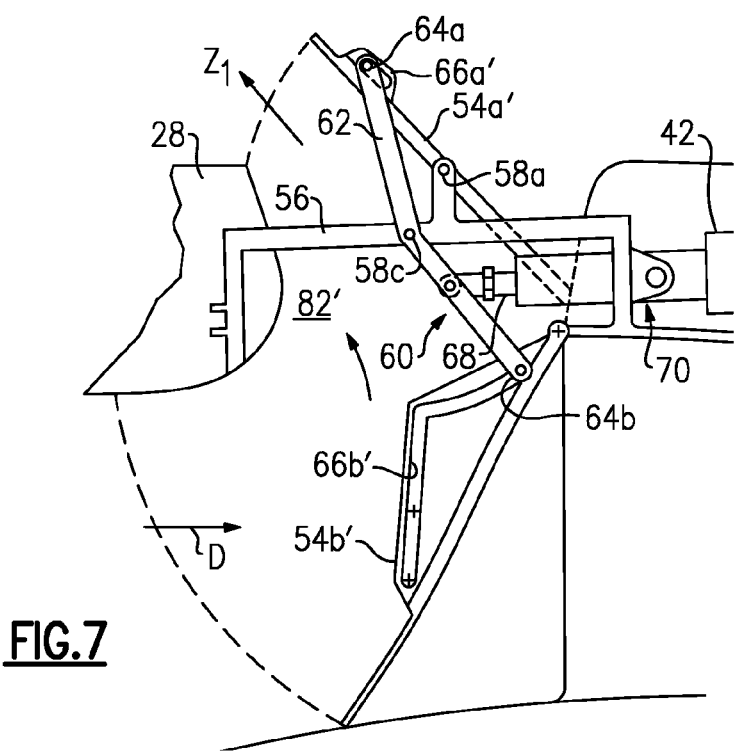
FIG. 7 is a schematic view of another embodiment of the nozzle doors and linkage, in a thrust reverse position.

FIG. 7 illustrates a modified example nozzle 40' wherein the nozzle doors 54a' and 54b' and slots 66a' and 66b' are different from the example shown in FIGS. 2, 3, and 5. In his example, the slot 66a' is not as long as the slot 66a of the previous example, and the slot 66b' is non-linear. Thus, as the actuator 42 moves the linkage 60, the section 64a moves along the slot 66a' and the section 64b of the first link 62 moves along the non-linear slot 66b'. The non-linear slot 66b' permits the first link 62 to rotate through a larger range of motion than in the previous example, which in turn permits the outer nozzle door 54a' to open wider than in the previous example to direct the bypass airflow D in the forward direction $Z_1$. In this example, the opening the outer nozzle door 54a' wider additionally allows the louvers 74 of the previous example to be eliminated.

The disclosed example nozzles 40, 40' thereby integrates the functions of varying the cross-sectional area of the bypass passage 30 to influence the bypass airflow D in a desired manner and thrust reversal for slowing forward movement of an aircraft. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A method of controlling a gas turbine engine system disposed about a centerline axis and having a fan bypass passage for conveying a bypass airflow, comprising the steps of:

moving a first nozzle door, a second nozzle door that is located radially inwards of the first nozzle door relative to the centerline axis, and a louver section in unison between a plurality of positions to influence the bypass airflow through the fan bypass passage;

moving each of the nozzle doors about a pivot point; and moving the first nozzle door in an aft direction about its pivot point in unison with moving the second nozzle door in a forward direction about its pivot point.

2. The method as recited in claim 1, including moving the first nozzle door and the second nozzle door to change a cross-sectional area associated with the fan bypass passage.

3. The method as recited in claim 1, including moving the first nozzle door and the second nozzle door to a position that deflects the bypass airflow in a forward direction to produce a thrust reversing force.

4. The method as recited in claim 1, including moving a linkage to move the first nozzle door and the second nozzle in unison with the louver section connected to the linkage.

5. The method as recited in claim 4 wherein the louver section includes a plurality of louvers that are each moveable about corresponding pivots, each of the plurality of louvers includes an end that is connected with a link rod that connects to the linkage, including moving the linkage to move the link rod to move the plurality of louvers about the pivots.

6. The nozzle as recited in claim 4, wherein the linkage includes a link having a first linear section that extends in a first lengthwise direction and a second linear section that extends in a second lengthwise direction that is transverse to the first lengthwise direction.

7. The method as recited in claim 1, wherein the first nozzle door and the second nozzle door are pivotally connected to a frame supported by a nacelle.

8. The method as recited in claim 7, wherein an actuator is disposed downstream of a portion of the frame.

9. The method as recited in claim 1, including employing the louver section to direct the bypass airflow in a forward direction in one of a plurality of louver positions and employing the louver section to direct the bypass airflow in an aft direction in another of the plurality of louver positions.

10. The method as recited in claim 1, wherein the first nozzle door includes a linear slot and the second nozzle door includes a non-linear slot.

* * * * *